(12) United States Patent
Gumaste et al.

(10) Patent No.: US 9,960,878 B2
(45) Date of Patent: May 1, 2018

(54) SCALABLE ULTRA DENSE HYPERGRAPH NETWORK FOR DATA CENTERS

(71) Applicant: Indian Institute of Technology, Mumbai (IN)

(72) Inventors: Ashwin Gumaste, Mumbai (IN); Aniruddha Kushwaha, Mumbai (IN)

(73) Assignee: Indian Institute of Technology Bombay, Mumbai (IN)

( * ) Notice: Subject to any disclaimer, the term of this patent is extended or adjusted under 35 U.S.C. 154(b) by 0 days. days.

(21) Appl. No.: 15/344,861

(22) Filed: Nov. 7, 2016

(65) Prior Publication Data

US 2017/0054524 A1 Feb. 23, 2017

Related U.S. Application Data

(63) Continuation-in-part of application No. 14/043,844, filed on Oct. 1, 2013, now Pat. No. 9,742,518.

(30) Foreign Application Priority Data

Nov. 18, 2015 (IN) .......................... 4340/MUM/2015

(51) Int. Cl.
*H04J 14/02* (2006.01)
*H04B 10/275* (2013.01)
(Continued)

(52) U.S. Cl.
CPC ........ *H04J 14/0212* (2013.01); *H04B 10/032* (2013.01); *H04J 14/0283* (2013.01);
(Continued)

(58) Field of Classification Search
CPC .............. H04J 14/0212; H04J 14/0283; H04B 10/032; H04Q 11/0005; H04Q 11/0062;
(Continued)

(56) References Cited

U.S. PATENT DOCUMENTS 6,084,694 A * 7/2000 Milton ................ H04J 14/0206
398/1
6,288,811 B1 * 9/2001 Jiang ................... H04J 14/0213
398/79

(Continued)

OTHER PUBLICATIONS

Bitar et al, Technologies and Protocols for Data Center and Cloud Networking, Sep. 2013, IEEE, All Document.*

*Primary Examiner* — Ken N Vanderpuye
*Assistant Examiner* — Dibson Sanchez (57) ABSTRACT

A network capable of being used in a datacenter is described. The network can comprise a set of optical fiber rings, wherein each optical fiber ring carries data traffic on multiple wavelengths, and wherein each optical fiber ring is partitioned into multiple sectors. In some embodiments, each sector in the multiple sectors can comprise: (1) only one add-wavelength-selective-switch (add-WSS) communicatively coupled to only one optical fiber ring in the set of optical fiber rings, wherein the only one add-WSS is used for sending all data traffic that originates from the sector and is destined to other sectors; (2) an add-electro-optical-switch (add-EOS) communicatively coupled to the add-WSS; (3) a set of drop-wavelength-selective-switches (drop-WSSs) communicatively coupled to the set of optical fiber rings, wherein the set of drop-WSSs are used for receiving data traffic from other sectors; and (4) a drop-electro-optical-switch (drop-EOS) communicatively coupled to a drop-WSS in the set of drop-WSSs.

6 Claims, 6 Drawing Sheets

(51) Int. Cl.
*H04Q 11/00* (2006.01)
*H04B 10/032* (2013.01)

(52) U.S. Cl.
CPC ..... *H04Q 11/0005* (2013.01); *H04Q 11/0062* (2013.01); *H04Q 2011/0016* (2013.01); *H04Q 2011/0039* (2013.01); *H04Q 2011/0041* (2013.01); *H04Q 2011/0081* (2013.01)

(58) Field of Classification Search
CPC ... H04Q 2011/0016; H04Q 2011/0039; H04Q 2011/0041; H04Q 2011/0081
USPC .................................. 398/58–59, 79, 82–88
See application file for complete search history.

(56) References Cited

U.S. PATENT DOCUMENTS

| | | | | |
|---|---|---|---|---|
| 6,348,985 B1* | 2/2002 | Jiang | ................... | H04J 14/0216 398/82 |
| 6,414,767 B1* | 7/2002 | Blair | ................... | H04J 14/0227 370/424 |
| 6,590,681 B1* | 7/2003 | Egnell | ................. | H04J 14/0204 398/59 |
| 6,751,192 B1* | 6/2004 | Nakata | ................ | H04J 14/0227 370/222 |
| 6,798,993 B1* | 9/2004 | Adams | ................. | H04J 14/021 398/115 |
| 7,184,666 B1* | 2/2007 | Li | ....................... | H04J 14/0204 398/81 |
| 7,206,510 B2* | 4/2007 | Suzuki | .................... | H04J 14/02 398/3 |
| 7,499,647 B2* | 3/2009 | Way | ..................... | H04B 10/503 398/3 |
| 7,606,500 B2* | 10/2009 | Hofmeister | ........... | H04B 10/29 398/135 |
| 8,155,521 B2* | 4/2012 | Chung | ................. | H04J 14/0219 398/45 |
| 8,175,107 B1* | 5/2012 | Yalagandula | ........... | H04L 45/66 370/408 |
| 8,670,669 B2* | 3/2014 | Gazzola | .............. | H04J 14/0204 398/45 |
| 8,965,203 B1* | 2/2015 | Vandat | ................ | H04J 14/0282 385/16 |
| 9,654,852 B2* | 5/2017 | Yin | ..................... | H04Q 11/0062 |
| 2002/0018616 A1* | 2/2002 | Li | ....................... | H04J 14/0283 385/24 |
| 2002/0075538 A1* | 6/2002 | Jiang | ................... | H04J 14/0216 398/83 |
| 2003/0156845 A1* | 8/2003 | Persson | ............... | H04B 10/275 398/141 |
| 2003/0185567 A1* | 10/2003 | Kurumida | .......... | H04J 14/0204 398/79 |
| 2003/0223682 A1* | 12/2003 | Kinoshita | .......... | H04J 14/0204 385/24 |
| 2004/0141746 A1* | 7/2004 | Oberg | ................ | H04J 14/0241 398/59 |
| 2004/0175071 A1* | 9/2004 | Oberg | ................ | H04J 14/0204 385/24 |
| 2005/0185959 A1* | 8/2005 | Kinoshita | .......... | H04J 14/0227 398/59 |
| 2005/0191054 A1* | 9/2005 | Aoki | ................... | H04J 14/0204 398/45 |
| 2006/0034610 A1* | 2/2006 | Akiyama | ........... | H04J 14/0204 398/83 |
| 2006/0133811 A1* | 6/2006 | Gumaste | ............. | H04J 14/0227 398/83 |
| 2006/0210274 A1* | 9/2006 | Lichtman | ........... | H04J 14/0201 398/83 |
| 2006/0228112 A1* | 10/2006 | Palacharla | ............. | H04J 14/02 398/45 |
| 2006/0257143 A1* | 11/2006 | Cavazzoni | ......... | H04J 14/0241 398/49 |
| 2007/0025729 A1* | 2/2007 | Barnard | ............. | H04J 14/0204 398/5 |
| 2008/0002570 A1* | 1/2008 | Kurokawa | ........... | H04L 12/462 370/219 |
| 2008/0118245 A1* | 5/2008 | Chang | .................... | H04J 14/021 398/79 |
| 2008/0131128 A1* | 6/2008 | Ota | ...................... | H04J 14/0201 398/79 |
| 2010/0306408 A1* | 12/2010 | Greenberg | .......... | H04L 12/4633 709/238 |
| 2011/0116790 A1* | 5/2011 | Sakauchi | ........... | H04J 14/0204 398/5 |
| 2012/0008945 A1* | 1/2012 | Singla | ................ | H04J 14/0204 398/49 |
| 2012/0020663 A1* | 1/2012 | McLaren | ............. | H04B 10/801 398/48 |
| 2012/0033968 A1* | 2/2012 | Testa | ................... | H04J 14/0204 398/47 |
| 2012/0170932 A1* | 7/2012 | Chu | ........................ | H04J 14/0202 398/48 |
| 2012/0243403 A1* | 9/2012 | Hu | ........................ | H04L 61/103 370/217 |
| 2012/0250679 A1* | 10/2012 | Judge | .................... | H04L 49/351 370/359 |
| 2012/0321309 A1* | 12/2012 | Barry | ...................... | H04J 14/00 398/51 |
| 2013/0022352 A1* | 1/2013 | Yamashita | .......... | H04J 14/0212 398/34 |
| 2013/0243431 A1* | 9/2013 | Pointurier | .............. | H04B 10/29 398/48 |
| 2013/0287397 A1* | 10/2013 | Frankel | ................ | H04B 10/271 398/50 |
| 2014/0119728 A1* | 5/2014 | Zhang | ................. | H04J 14/0204 398/48 |
| 2015/0063807 A1* | 3/2015 | Simonneau | ........... | H04B 10/25 398/59 |
| 2015/0098700 A1* | 4/2015 | Zhu | .................... | H04Q 11/0005 398/48 |
| 2015/0147060 A1* | 5/2015 | Patel | .................. | H04Q 11/0005 398/48 |
| 2015/0181317 A1* | 6/2015 | Yin | ..................... | H04Q 11/0062 398/45 |
| 2015/0312659 A1* | 10/2015 | Mehrvar | ............. | H04Q 11/0005 398/45 |
| 2016/0380886 A1* | 12/2016 | Blair | ....................... | H04L 45/50 398/49 |

\* cited by examiner

| 256 node per sector | | | | | |
|---|---|---|---|---|---|
| Number of Servers | 1000 | 10000 | 100000 | 1000000 | 10000000 |
| Number of Sectors | 4 | 40 | 391 | 3907 | 39063 |
| Number of Fiber rings | 1 | 7 | 66 | 652 | 6511 |
| Number of Transceivers | 7684 | 77080 | 776526 | 10048804 | 329340153 |
| Transceiver utilization ratio | 8 | 8 | 8 | 10 | 33 |
| EOS Port Count | 513 | 519 | 578 | 1164 | 7023 |
| End To End Loss(dB) | 33.6 | 55.0 | 64.7 | 74.7 | 84.7 |
| Number of amplifier | 1 | 1 | 2 | 2 | 3 |
| OSNR (dB) | 22.5 | 19.2 | 16.5 | 14.6 | 11.4 |
| OSNR with FEC (dB) | 31.5 | 28.2 | 25.5 | 23.6 | 20.4 |

FIG. 3A

| 64 node sector | | | | | |
|---|---|---|---|---|---|
| Number of servers | 1000 | 10000 | 100000 | 1000000 | 10000000 |
| Number of sectors | 16 | 157 | 1563 | 15625 | 156250 |
| Number of fiber rings | 3 | 27 | 261 | 2605 | 26042 |
| Number of transcievers | 7728 | 79599 | 1158183 | 48203125 | 4144062500 |
| Transceiver utilization ratio | 8 | 8 | 12 | 48 | 414 |
| EOS Port Count | 131 | 155 | 389 | 2733 | 26170 |
| End To End Loss(dB) | 45 | 55 | 65 | 75 | 85 |
| number of amplifier | 1 | 2 | 2 | 3 | 3 |
| OSNR | 20.60 | 17.42 | 15.41 | 12.87 | 10.00 |
| OSNR with FEC | 29.60 | 26.42 | 24.41 | 21.87 | 19.00 |

FIG. 3B

| Service Type | Lookup ID | Primary SRL | Protect on SRL | Rate Limiter Information (cir,cbs) | QoS level |
|---|---|---|---|---|---|
| MAC | C4:85:08: A2:CD:4A | 0111001 0101 | 1011001 0011001 0 | 125,2 | 2 |
| IPv4 | 10.89.43. 66 | 1100100 0100 | 1100100 111100 | 300,3 | 1 |
| ... | ... | ... | ... | ... | ... |
| ... | ... | ... | ... | ... | ... |
| IPv6 | 5820:f2cc ::9 | 0001000 100 | 1111101 00000 | 450,2 | 4 |
| VLAN | 26 | 1110001 000 | 1100000 10110 | 200,2 | 4 |

FIG. 6A Normal operation

FIG. 6B Operation after restoration

SCALABLE ULTRA DENSE HYPERGRAPH NETWORK FOR DATA CENTERS

RELATED APPLICATION

This application claims, under 35 U.S.C. § 119, benefit of Indian Patent Application No. 4340/MUM/2015, having the same title and inventors, filed on 18 Nov. 2015. This application is also a continuation-in-part of U.S. application Ser. No. 14/043,844, entitled "Flexible Interconnection of Scalable Systems Integrated using Optical Networks for Datacenters," by inventors Ashwin Gumaste and Bala Murali Krishna Bheri, filed on 1 Oct. 2013, the contents of which are herein incorporated by reference in their entirety for all purposes. U.S. application Ser. No. 14/043,844 claims, under 35 U.S.C. § 119, benefit of Indian Patent Application No. 1980/MUM/2013, entitled "Flexible Interconnection of Scalable Systems Integrated using Optical Networks for Datacenters," by inventors Ashwin Gumaste and Bala Murali Krishna Bheri, filed on 10 Jun. 2013.

BACKGROUND

Technical Field

This disclosure relates to computer networking. More specifically, this disclosure relates to a scalable ultra dense hypergraph network for datacenters.

Related Art

Datacenters (DCs) are considered as the brain of the Internet—storing repositories of easily accessible information. The architecture of data-centers has gathered significant attention in the recent years. The classical model of providing top-of-the-rack switches in a hierarchical fashion and interconnecting these to an edge router is well deployed. This architecture has two limitations: (1) providing scalability of the DC interconnection fabric, and (2) scaling a protocol to support the vast number of systems (servers, storage). With the surge of social media, explosion of video content, latency sensitive applications being consumed by mobile backhaul and the general thought of gigabit-to-the-home, there is a tremendous stress on the data-center infrastructure. The DC must now scale to meet the requirements of applications, some of which interact within the data-center environment as well as have latency tolerance that causes severe testing of service provider service level agreements (SLAs).

The common methodology of data-center design is to deploy a large number of commonly available off-the-shelf computing elements interconnected across a redundant networking fabric. To meet the scalability of the networking fabric, the key-requirement is to be able to provision 10s of 1000s of servers in an efficient and fault-tolerant mechanism within the DC. Bandwidth bottlenecks are created by traditional hierarchical designs and it becomes difficult to meet the requirements of full bisection bandwidth as the number of servers increases.

A second problem that arises from this scalability is to support protocol within the DC environment. The common Layer 2-3 protocols of Ethernet and IP do not scale in such environments. Ethernet has issues of scalability when used in its conventional form of Ethernet bridges. Internet Protocol (IP) scales, but the processing of IP packets at each branch and leaf in a hierarchical tree within the DC environment causes unacceptable processing delays and is expensive.

SUMMARY

Some embodiments disclosed herein provide an incrementally scalable network that is technically and financially feasible and that is capable of being deployed in a datacenter to interconnect a large number (e.g., hundreds of thousands or millions) of systems (e.g., servers) with one another.

Some embodiments disclosed herein feature a network that comprises a set of optical fiber rings. For example, the network may be used as a datacenter backplane to communicatively couple a set of servers in a datacenter. The set of optical fiber rings can include clockwise optical fiber rings and counter-clockwise optical fiber rings, wherein the set of optical fiber rings are configured to perform protection switching upon detecting a failure. Each optical fiber ring can carry data traffic on multiple wavelengths, and each optical fiber ring may be partitioned into multiple sectors. Each sector in the multiple sectors can comprise: (1) an add-wavelength-selective-switch (add-WSS) communicatively coupled via a passive optical coupler to an optical fiber ring in the set of optical fiber rings (in some embodiments there is only one add-WSS per sector that is coupled via a single passive optical coupler to only one optical fiber ring); (2) an add-electro-optical-switch (add-EOS) communicatively coupled to the add-WSS; (3) a set of drop-wavelength-selective-switches (drop-WSSs) communicatively coupled via a set of passive optical couplers to the set of optical fiber rings; and (4) a drop-electro-optical-switch (drop-EOS) communicatively coupled to a drop-WSS in the set of drop-WSSs.

In some embodiments, each sector in the multiple sectors can comprise a set of aggregation switches, wherein each aggregation switch in the set of aggregation switches is communicatively coupled with the add-EOS and the drop-EOS. Furthermore, each sector in the multiple sectors further comprises a set of edge switches, wherein each edge switch in the set of edge switches is communicatively coupled with each aggregation switch in the set of aggregation switches. Moreover, each sector in the multiple sectors further comprises a set of servers, wherein each server in the set of servers is communicatively coupled to at least one edge switch in the set of edge switches.

Some embodiments disclosed herein feature an incrementally scalable datacenter. Specifically, the datacenter can include a set of optical fiber rings, wherein each optical fiber ring carries data traffic on multiple wavelengths, and wherein each optical fiber ring is partitioned into a set of sectors. The datacenter can also include a set of racks, wherein each rack corresponds to a sector, wherein each rack includes a set of servers that is stacked vertically in the rack, and wherein each rack includes a set of top-of-the-rack (ToR) switches that is communicatively coupled to each server in the rack. In some embodiments, the set of ToR switches comprises: (1) an add-WSS communicatively coupled to only one optical fiber ring in the set of optical fiber rings; (2) an add-EOS communicatively coupled to the add-WSS; (3) a set of drop-WSSs communicatively coupled to the set of optical fiber rings; and (4) a drop-electro-optical-switch (drop-EOS) communicatively coupled to a drop-WSS in the set of drop-WSSs.

In some embodiments, the set of ToR switches further comprises: (1) a set of aggregation switches, wherein each aggregation switch in the set of aggregation switches is communicatively coupled with the add-EOS and the drop-EOS; and (2) a set of edge switches, wherein each edge switch in the set of edge switches is communicatively coupled with each aggregation switch in the set of aggregation switches, and wherein each server in the rack is communicatively coupled to at least one edge switch in the set of edge switches.

In this disclosure, unless otherwise stated, the term "based on" means "based solely or partly on."

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Computer Networks

Computer networking is typically accomplished using a layered software architecture, which is often referred to as a networking stack. Each layer is usually associated with a set of protocols which define the rules and conventions for processing packets in that layer. Each lower layer performs a service for the layer immediately above it to help with processing packets. The Open Systems Interconnection (OSI) model defines a seven layered network stack.

At a source node, each layer typically adds a header as the payload moves from higher layers to lower layers through the source node's networking stack. A destination node typically performs the reverse process by processing and removing headers of each layer as the payload moves from the lowest layer to the highest layer at the destination node.

A network can include nodes that are coupled by links in a regular or arbitrary mesh topology. A networking stack may include a link layer (layer 2 in the OSI model) and a network layer (layer 3 in the OSI model). The link layer (e.g., Ethernet) may be designed to communicate packets between nodes that are coupled by a link, and the network layer (e.g., Internet Protocol or IP for short) may be designed to communicate packets between any two nodes within a network.

A device that makes forwarding decisions based on information associated with the link layer is sometimes called a switch. A device that makes forwarding decisions based on information associated with the network layer is sometimes called a router. The terms "switch" and "router" are used in this disclosure interchangeably to refer to a device that is capable of making forwarding decisions based on information associated with the link layer and/or the network layer.

Unless otherwise stated, the term "IP" refers to both "IPv4" and "IPv6" in this disclosure. In this disclosure, terms such as "frame," "packet," "cell," "datagram," and other similar terms that are used in the art are generally intended to refer to a group of bits.

Scalable Ultra Dense Hypergraph Architecture (SUDHA) Based Network

A data-center optical network that can scale to a large number of servers (even up to 1 million servers using off-the-shelf optics and electronics technology) is presented. The SUDHA network (the term "SUDHA network" refers to a network that is created based on the scalable ultra dense hypergraph architecture disclosed herein) is based on a backplane that consists of multiple optical bus based fiber rings arranged concentrically to create a multi-colored hypergraph. Sectors or stations that are top of the rack switches are connected to this switchless backplane in a unique opto-electronic architectural framework. Wavelength assignment schemes and bounds are stated. In addition to the novel, scalable and fault tolerant architecture an SDN based standardized carrier-class protocol is disclosed which is based on segment routing for use within the data-center. A test-bed to validate the technical and commercial feasibility of the SUDHA network is described. The SUDHA network is also evaluated for protocol, optical properties and functionality.

Data-center (DC) architecture is a richly debated topic especially with: (a) growth of cloud services; and (b) the impact of network functions being implemented within DC domains in the near future. There have been various approaches towards DC architecture that have focused on two types of scalability: (1) architectural scalability, to create a large virtualized cross-connect fabric and (2) protocol scalability, to support quick convergence, fault tolerance and virtualization. A unified architecture is needed that can scale in terms of both supporting a number of servers by providing a switching fabric as well as supporting a protocol that enables scalability and fault tolerance. Approaches to DC scalability include modifications of Clos architecture, to the use of optical switching within the DC. The former approach is used commonly in conjunction with electronic off-the-shelf switches and variants of this approach include designs that were disclosed in the following publications: (1) R. N. Mysore et al, "Portland: A scalable fault tolerant layer 2 data center network fabric," Proc. of the ACM SIGCOMM 2009, pp 39-50, August 2009, Barcelona, Spain; (2) C. Kim, M. Caesar, and J. Rexford, "Floodless in SEATTLE: A Scalable Ethernet Architecture for Large Enterprises," Proc. of the ACM SIGCOMM 2008, pp 3-14, August 2008, Seattle, Wash., USA; (3) C. Guo et al, "DCell: A scalable and fault-tolerant network structure for data centers," Proc. of the ACM SIGCOMM 2008, pp 75-86, August, 2008, Seattle, Wash., USA; and (4) A. Greenberg et al, "VL2: A scalable and flexible data center network," Proc. of the ACM SIGCOMM 2009, pp 51-62, August 2009, Barcelona, Spain. However electronic switches have size limitations.

From a protocol standpoint there has been sizable work in the use of modified IP and Ethernet to enable large scale DC architecture. The use of optics opens a new set of possibilities towards DC scalability with larger bandwidth support, seamless upgrade of server line-rates and better bisection bandwidth. The bottleneck manifested by electronic switching can be mitigated by the use of optics. There seems to a consensus on the use of optics as a force multiplier in the DC. The following publications describe some approaches that use optics in the DC as a switching element: (1) N. Farrington et al, "Helios: A hybrid electrical/optical switch architecture for modular data centers," Proc. of the ACM SIGCOMM 2010 conference, pp 339-350, August 2010, New Delhi, India; (2) G. Porter et al, "Integrating microsecond circuit switching into the data center," Proc. of the ACM SIGCOMM 2013 pp 447-458, August 2013, Hong Kong, China; (3) K. Chen et al, "OSA: An optical switching architecture for data center networks with unprecedented flexibility," Proc. of 9th USENIX Symposium on Networked Systems Design and Implementation (NSDI 12), pp 239-252, April 2012, San Jose, Calif., USA; (4) C. Guo et al, "BCube: A high performance, server-centric network architecture for modular data centers," Proc. of the ACM SIGCOMM 2009, pp 63-74, August 2009, Barcelona, Spain; and (5) K. Chen et al, "WaveCube: A Scalable, Fault-Tolerant, High-Performance Optical Data Center Architecture," In Proc. of 34th IEEE INFOCOM, Apr. 26-2015, Hong Kong.

A comparison of optical and electronic switching tells us that electronics technology is better developed than optical technology from a packet switching perspective. With electronic memories available, one can do address lookup, storage during contention resolution and other fancy traffic shaping policies. Optical technology on the other hand is slow to switch, and does not support any processing in the optical domain, though its biggest advantage is the large offered bandwidth. Optical switching is typically used between ports that send optical signal which could be wavelengths or a composite wavelength division multiplexed (WDM) signal. Such optical switches typically consist of wavelength selective switches (WSS) or arrayed waveguides (AWGs). AWG technology has been around for the past decade-and-half, while WSS, especially non-MEMS based WSS are a recent phenomenon. WSS can split, route, attenuate a composite WDM signal into constituent groups or wavelengths. Two variants of WSS are known—using liquid crystal on silicon (LCOS) and digital lightwave processing (DLP). While DLP provides fast switching it is known not to scale in number of ports and has reliability issues as compared to LCOS. Given that switching and address resolution are a challenge in the optical domain, the question we ask (and answer in the affirmative herein) is whether an architecture can be created that allows for a large data-center with up to even a million servers using standard off-the-shelf components?

This disclosure discloses an architecture, a protocol, and a network that facilitates the creation of a large DC fabric. Central to the disclosed architecture, which can be used for creating a network, is the premise of a switchless optical core—essentially a hypergraph that facilitates any-to-any connectivity within the DC core. The hypergraph is colored with the caveat that a vertex is allocated a particular color, while other vertices are directly connected to the vertex or can be connected using a multihop technique. Further, due to multiple fiber rings, there can be multiple vertices with the same color, using a unique interconnection pattern thus giving the DC unprecedented scalability. Apart from the switchless core, our architecture uses sectors that logically divide the core into groups. Within each sector we perform electronic switching as well as facilitate connection to servers. To facilitate a switchless core, we make use of optical bus technology that creates a virtual switch between sectors as ports. The optical bus is arranged and connected in a way so as to add as many buses as required without: (a) compromising on the existing architecture (in situ addition), and (b) facilitating a large number of sectors to be connected in a non-blocking manner. Each one-to-many optical bus is based on wavelengths or superchannels.

The disclosed architecture supports full bisection bandwidth for any number of servers with the caveat that the number of transceivers at a sector grows linearly. A protocol for the DC architecture is also described. The protocol incorporates the following features: (a) use of carrier-class attributes that facilitate service support, fault tolerance and (b) assumption of the DC as an SDN domain. Traffic entering the DC fabric from the Internet or from local servers is mapped on to the protocol data units (PDUs) based on policies set by a centralized controller. The protocol is based on segment routing (SR) in MPLS that facilitates scalability and carrier-class service support. One of the key advantages of segment routing with SDN based table population is the observed low-latency. Reduction to practice was demonstrated using a testbed that uses in-house segment routing capable routers in conjunction with optics that support the scalable bus technology. Measurements show how the SUDHA architecture can be deployed.

Figure 1:
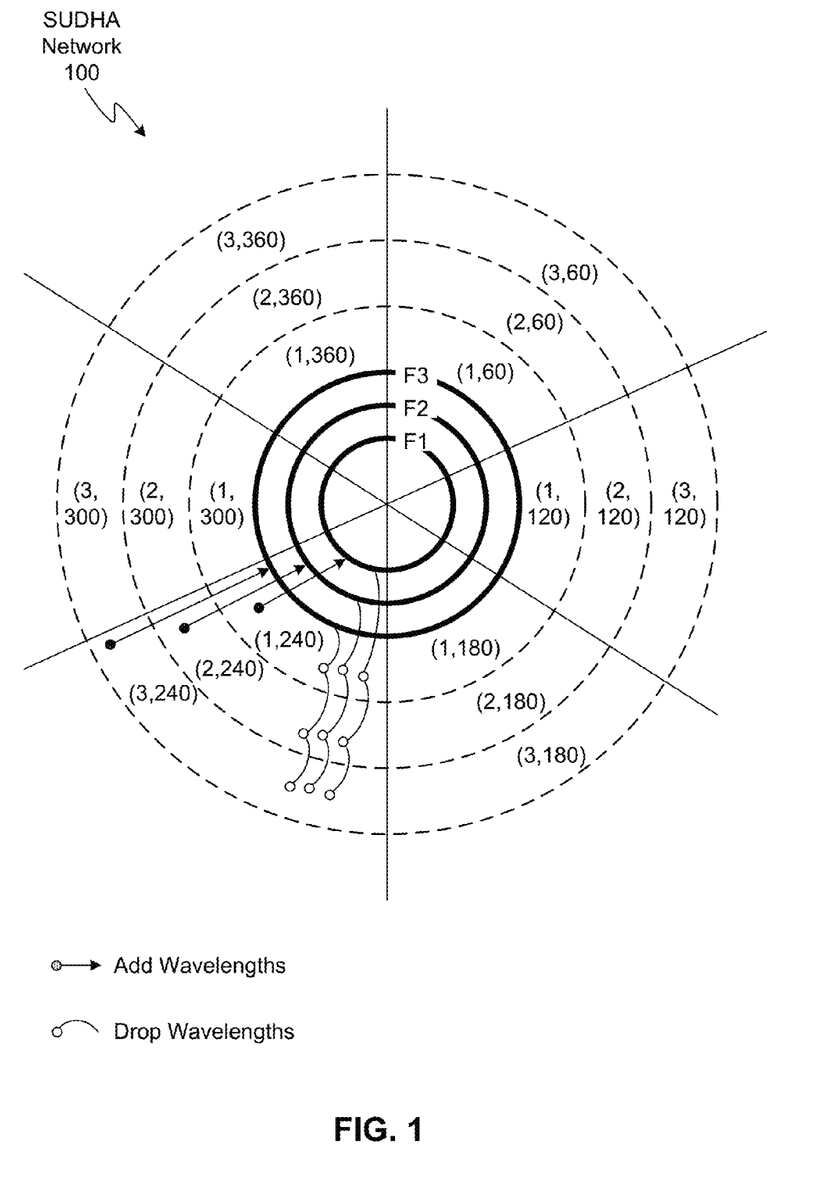
FIG. 1 illustrates a SUDHA network in accordance with some embodiments described herein.

FIG. 1 illustrates a SUDHA network in accordance with some embodiments described herein. SUDHA network 100 consists of a concentric arrangement of core fiber rings, wherein each core fiber ring is laid out as a pair of unidirectional buses. In other words, two counter-propagating fibers for duplex communication constitute a "ring." For example, SUDHA network 100 includes three rings labeled F1, F2, and F3 and illustrated using thick lines. Each ring is further divided into sectors. A sector is a rack or a group of racks, with a top of rack (ToR) switch.

The term "ToR switch" is a term of art that is used in the datacenter industry to refer to a component in a typical datacenter interconnection pattern. A datacenter usually includes multiple rows of racks, and each rack in each row of racks has multiple servers that are stacked vertically. In a well-known datacenter interconnection pattern, the servers in each rack are communicatively coupled (e.g., by fiber cables) to a switch that is located at the top of the rack, which is referred to as the ToR switch. Typically, in this datacenter interconnection pattern, the ToR switches in each row of racks can be communicatively coupled to the datacenter backplane. The term "datacenter backplane" generally refers to a high bandwidth network in the datacenter that is designed to communicate high volumes of data between the outside world and the datacenter and also between different rows of racks in the datacenter.

In embodiments described herein, one or more ToR switches in each row of racks can be connected to an optical scheduler, which can further be connected to the core rings in a typical interconnection pattern that is used in datacenters. In FIG. 1, each sector is labeled using a tuple (i, θ), where "i" is the fiber number and the "angle" θ corresponds to the sector (the sectors are labeled by a corresponding "angle," e.g., if there are six sectors, then the first sector can correspond to "(360/6)*1=60," the second sector can correspond to "(360/6)*2=120," and so forth).

A fiber ring can generally have n sectors. Each sector can support a folded-Clos network of electronic switches that supports segment routing (described below). A folded-Clos network is also sometimes referred to as a "fat tree network." The terms folded-Clos and "fat tree" are well known in the art. For example, further information on folded-Clos networks can be found in U.S. Pub. No. 20140133851A1, entitled "Switching clos network universal element." Specifically, in some embodiments, there are edge switches (ES s) that are connected to the servers and are of N×N configuration. ES s are connected to each other within a sector by aggregation switches (AS). AS s form the middle column of a Clos network. The AS s and ES s together form the Clos network. The N AS s have configuration of HM/N where H is the number of wavelengths allocated to a sector, and M is the muxponding gain of the system. There are naturally HM/N ES s in a sector. The AS s are also connected to top of the rack switches. The TOR switch along with the optical components and fiber ring scheduler is called EOS or Electro-Optic Switch. The EOSs are connected to the N AS on the sector side, and support an optical backplane on the core side.

The EOS architecture is responsible for achieving scalability by providing an interconnection structure with the backplane. The EOS consists of electronics for connecting to AS s within the sector, and optics to connect to the backplane. The optics comprises of LCOS based WSSs and couplers. WSS come in two configurations. A typical WSS is a 1×X structure that facilitates a single input of composite WDM to be routed into X ports facilitating demultiplexing of channels in any manner and distribution among the X ports. A mirror image, i.e., an X×1 structure is also used in the EOS for adding data into the fiber ring.

A second WSS configuration is the X×Y design which is like a wavelength router and allows for routing of a X ports connected to Y output ports, routing any wavelength combination from any of the X input ports to any combination amongst any of the Y output ports. For example, JDSU's TrueFlex® Twin High Port Count Wavelength Selective Switch can be used for this purpose. Note that switching in LCOS based WSSs takes 2-4 milliseconds and a design goal is to avoid such switching or reduce it as much as possible.

The electronic part of the EOS consists of a scheduler and packet mapper that maps packets from the AS to appropriate wavelengths and fiber ring in the backplane. Similarly, packets from the backplane are appropriately selected by the mapper and routed to the destination AS.

Figure 2A:
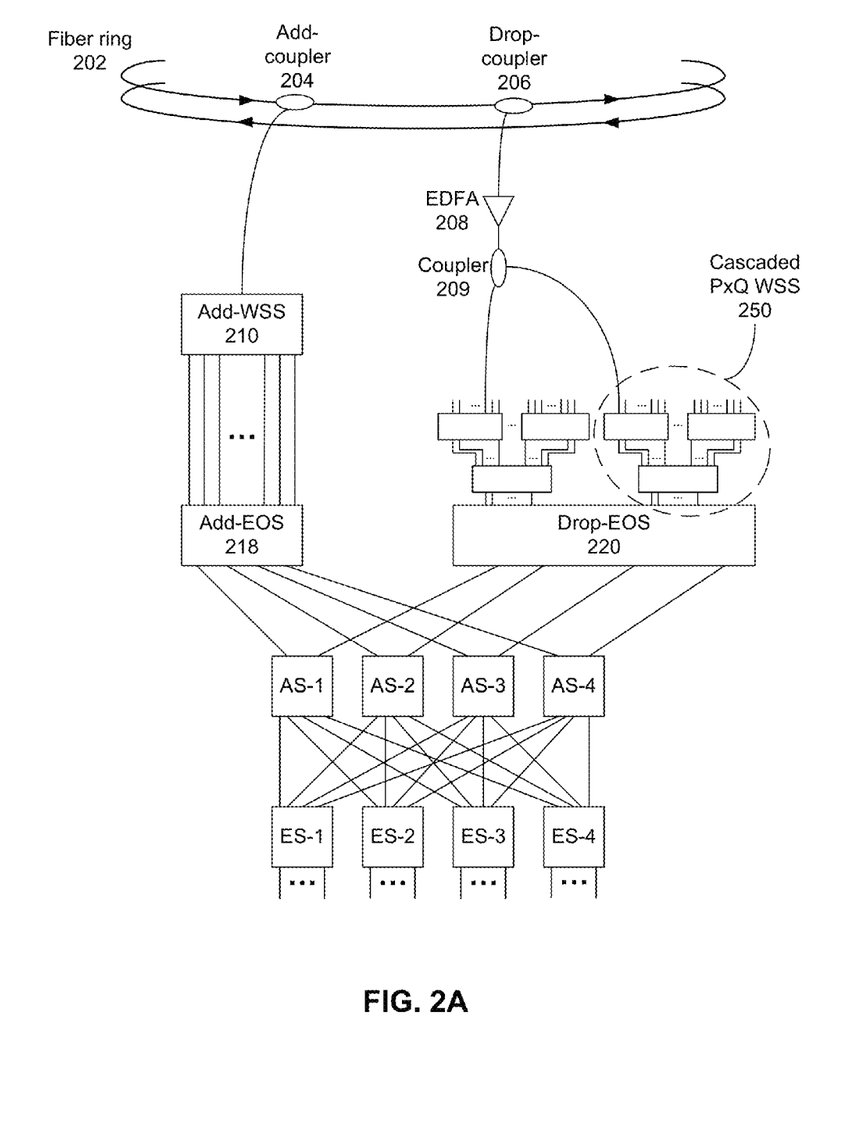
FIG. 2A illustrates an EOS architecture in accordance with some embodiments described herein.
Figure 2B:
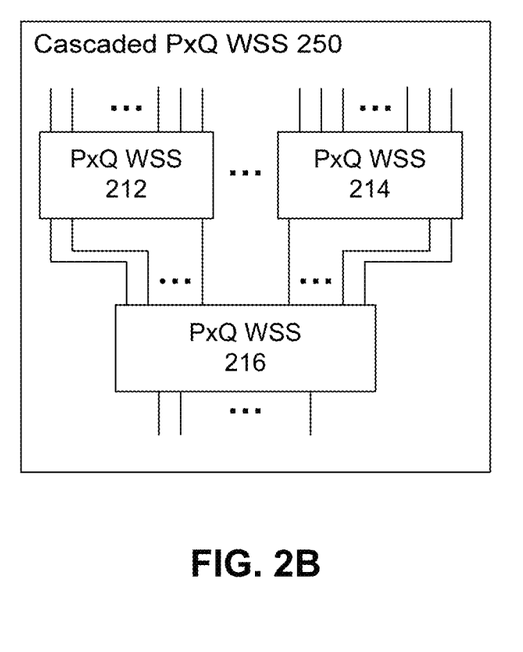
FIG. 2B illustrates a cascaded P×Q WSS in accordance with some embodiments described herein.

FIG. 2A illustrates an EOS architecture in accordance with some embodiments described herein. FIG. 2B illustrates a cascaded P×Q WSS in accordance with some embodiments described herein.

FIG. 2A illustrates the EOS architecture for one sector of one ring. Add-coupler 204 can add an optical signal to fiber ring 202, and drop-coupler 206 can be used to tap an optical signal from fiber ring 202. Edge switches ES-1 through ES-4 can be communicatively coupled to servers (not shown in FIG. 2A). Edge switches ES-1 through ES-4 can be communicatively coupled to aggregation switches AS-1 through AS-4. Although four edge switches and four aggregation switches have been shown in FIG. 2A, the number of edge and aggregation switches can generally be greater than or less than four depending on the bandwidth requirements.

Aggregation switches AS-1 through AS-4 can be communicatively coupled to add-EOS 218 that is used for adding an optical signal to fiber 202, and to drop-EOS 220 that is used for processing an optical signal that was dropped from fiber ring 202. Add-EOS 218 can be communicatively coupled to add-WSS 210 that add an optical signal having a specific wavelength to fiber ring 202 via add-coupler 204. Aggregation switches AS-1 through AS-4 can also be communicatively coupled to drop-EOS 220 which provides network traffic that was dropped from fiber ring 202 at this sector. Specifically, the optical signal tapped by drop-coupler 206 from fiber ring 202 can be provided to erbium-doped fiber amplifier (EDFA) 208. The amplified optical signal can then pass through a 1×ψ coupler (Coupler) 209. ψ is an integer that indicates degree of contention of wavelength of EOS. Each port of ψ coupler can pass through a cascaded P×W WSS 250. Cascaded P×W WSS 250 is shown in FIG. 2B that includes a two-stage network of P×Q WSSs (including P×Q WSSs 212, 214, and 216). "P" and are integers that indicate the number of upstream (i.e., toward the datacenter backplane) and downstream (i.e., toward the servers) facing ports on the WSS. The value of "P" and "Q" can be selected based on the bandwidth requirements and/or based on the WSS products that are available from vendors. The set of P×Q WSSs can be referred to as a set of drop-WSSs. The selected optical wavelengths can be provided to drop-EOS 220. Drop-EOS 220 can then perform optoelectronic conversion and switching (as necessary) before forwarding the network traffic to the aggregation switches AS-1 through AS-4.

Scalability is achieved by adding any number of sectors in the DC using a unique interconnection technique at the EOS. To be able to add a large number of sectors we should be able to create a mechanism for non-blocking communication between the sectors. This mechanism is possible through the datacenter backplane design.

A sector is connected to the backplane in the following manner. It can add data to one ring in the backplane, while it can drop data from all the rings in the backplane. This is illustrated in FIG. 1—each sector can add a wavelength to a given fiber ring (the term "add a wavelength to a fiber ring" can mean transmitting an optical signal that encodes data, wherein the optical signal has a given wavelength, wherein the optical signal is added to given fiber ring via a coupler, and wherein the given fiber ring may carry other optical signals on other wavelengths), but can drop data from all of the rings (the term "drop data from a fiber ring" can mean receiving an optical signal that encodes data, wherein the optical signal has a given wavelength, and wherein the optical signal is received from the fiber ring via a drop coupler). The ring to which it can add data is called its parent ring, and is denoted by i.

The backplane is a multi-colored hypergraph, laid out using concentric fiber rings. Each ring has up to n interconnection points, each of which subtends a sector. Each ring is open, i.e., the optical signal is not allowed to circulate in a loop in the fiber ring to prevent saturation of active optical elements (amplifiers etc.). In other words, each ring is logically a bus, i.e., each ring is logically a pair of counter-propagating unidirectional multi-wavelength buses with n supported stations. Each station can access all the data in the bus without the need for any switching.

The EOS architecture illustrated in FIG. 2A is an example of an architecture that can be used in each station in accordance with some embodiments described herein. To create a bus architecture, each station on the bus supports two power couplers—for adding data (Add Coupler or AC for short), and for dropping data (Drop Coupler or DC for short). These couplers are of asymmetric power ratio (discussed below). The ring is open and whenever there is a fiber cut, the open ring is closed thereby facilitating fault tolerance using the ring wrap-around—as is common in SONET/SDH or metro WDM ring environments. The details of the construction and the operation of the datacenter backplane are now described.

Datacenter Backplane

The innermost ring in the backplane is labeled F1 (see e.g., FIG. 1), while the outermost ring is labeled as FF (in FIG. 1, there are three rings, so the outermost ring is labeled F3; however, in general there could be any number of rings, e.g., F rings, and in the general case the outermost ring will be labeled FF). The sectors on the ring are labeled by their ring prefix and the traced clockwise angle of their position in their ring with respect to an arbitrarily selected starting station. To illustrate this further, since there are n sectors attached to a ring, we assume each station (sector) to be at $2\pi/n$ apart from their adjacent sectors. Hence, a sector is labeled by the tuple $(f, 2\pi j/n)$ where j is the sector number relative to the first sector attached to the ring. At a particular angular location (each angular location is also referred to as a "station" in this disclosure), i.e., for j=1, 2, . . . , n, we have F sectors, each connected to a separate ring. For example, see FIG. 1 and the associated description above. Hence, at the drop side on the jth station, we have a 1×F splitter of power ratio A:B, where B portion of the power is dropped among the F ports, and A is carry-forwarded to the $(j+1)^{st}$ sector. If a sector has a requirement of H wavelengths to add into the core then n=W/H, where W is the total number of wavelengths in the ring.

The drop and sides of the backplane architecture are now described. Data is dropped by a fiber at a station, and is further split by the drop coupler into F ports, wherein each of the F ports corresponds to a sector at the station or angular location. If F is large, then several smaller 1×X couplers can be cascaded to create a larger 1×F coupler, where X<F, and support the structure with the use of optical amplifiers to ensure that the power budget is adequate. Each of the F ports go to a separate sector, i.e., a port on the coupler represents a unique sector. Each of the F ports is connected to 1×ψ coupler where ψ≤F and it is the degree of contention to a wavelength that an EOS can support. Similar to 1×F coupler 1×ψ coupler can also be created using several smaller 1×X coupler. Each of the port of 1×ψ coupler is connected to separate cascaded P×Q WSS. This is illustrated in FIG. 2A. Specifically, the fiber that communicatively couples drop-coupler 206 to EDFA 208 corresponds to one of the F ports on drop-coupler 206 (the output of EDFA 208 is provided to a port on P×Q WSS 212 as shown in FIG. 2A).

Without loss of generality, let us assume there are H.M servers per sector, where H is the number of wavelengths/superchannels that a sector can add and M is a muxponding gain. M could be: (a) the number of servers per wavelength in the backplane to achieve full bisection bandwidth, or (b) the overprovisioning factor enabling capacity for intra-sector traffic resulting in less than full bisection bandwidth. Then, the drop at the sector EOS can consist of W×ψ ports coming from P×Q WSS where P=F×ψ and Q=W×ψ. The exact number of dropped channels depends on the wavelength assignment strategy (described below). The add side of the EOS consists of a 1×H WSS (either created using one WSS if H is small, or created using a cascade of WSSs).

The SUDHA network scales by adding sectors and rings in an in-situ fashion. For adding sectors, all we must ensure is that every other sector has a port to accept traffic from this sector. This is possible by cascading more WSSs to the drop WSS (that has P×Q configuration). The power budget can be analyzed as follows. Let $P_{in}$ be the input power of a channel, let $P_{WSS}$ be the insertion loss of cascaded WSS (drop WSS), and let $P_{coupler}$ be the combined coupler losses. Then, the received channel power $P_r$ at any sector can be given by:

$$P_r = P_{in} - P_{WSS} - N \cdot P_{coupler} + 10 \log\left[\left(\frac{A}{A+B}\right)^{j-1} - \left(\frac{A}{A+B}\right)^{j}\right] - 10\log F - 10\log\psi - P_{WSS}.$$

$P_r$ must be greater than receiver sensitivity threshold. The optical signal-to-noise (OSNR) ratio can be computed as follows. Note that the OSNR is an important parameter to consider for demonstrating that the SUDHA network can scale at the receiver. The EOS-to-EOS OSNR can be computed as follows:

$$\frac{1}{OSNR_{final}} = \frac{1}{OSNR_{1\times F}} + \frac{1}{OSNR_{stage}} + \ldots + \frac{1}{OSNR_{stage}},$$

where $OSNR_{1\times F}$ is calculated just before the 1×F coupler, and the $OSNR_{stage}$ values are calculated between the 1×F coupler and the EOS receiver as required depending on the number of amplifier stages.

Figure 3A:
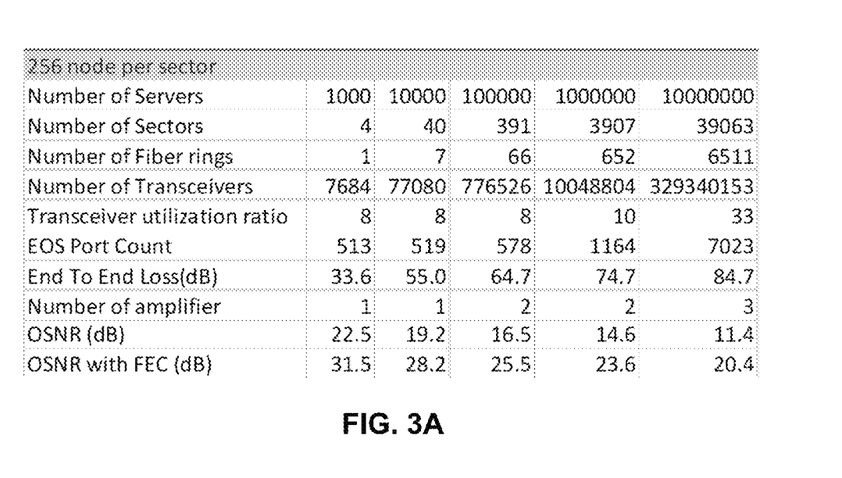
FIG. 3A illustrates resources required when an embodiment of a 256-nodes-per-sector SUDHA network is scaled in accordance with some embodiments described herein.

FIG. 3A illustrates resources required when an embodiment of a 256-nodes-per-sector SUDHA network is scaled in accordance with some embodiments described herein. In FIG. 3A, the first row gives the number of servers in the DC, the second row states how many sectors are required, while the third row states how many fiber rings are needed. Row #5 defines the transceiver utilization ratio that tells us how much over provisioning at the EOS is required in order to guarantee a 100% bisection bandwidth for any traffic mix. Row #6 is the most crucial design element as it defines the size of the cross-connect at the EOS. Note that even for 1 million servers, the EOS cross connect is of the order of just 1000 ports—which is easily achievable. The bottom 4 rows give us the optical characteristics with OSNR values. Forward Error Correction (FEC) is used for larger-sized DC to combat losses and inherent amplifier noise.

In the computations shown in FIG. 3A, the ES in each sector is assumed to be 16×16 configuration though an ES of 64×64 is also currently possible. The AS is assumed to be 16×16 as well, and 16 ESs and ASs are used. For the generation of the results we do not assume any muxponding/overprovisioning gain. That is to say that each server sends data at line-rate C (assumed 10 Gbps), and the backplane adequately provisions 10 Gbps per server. In the example shown in FIG. 3A, the wavelength plan in the backplane involves 12.5 GHz spacing between channels. We assume that the EOS multiplexes 4×10 Gbps into a single 40 Gbps DP-DQPSK (Dual Polarized Differential QPSK) or 10×10 Gbps into a single 100 Gbps channel (DP-DQPSK). The total number of wavelengths assumed is 192 channels across C band and another 192 channels across L band. The network configurations illustrated in this disclosure were based on the assumption that the traffic is symmetric, i.e., with every sector having a dedicated wavelength to every other sector. However, with multihopping across sectors, we can support any traffic pattern.

Consider the network example shown in column #3 in the table shown in FIG. 3A for ψ=1, i.e., the case of 10,000 servers in the DC. With the SUDHA architecture, we use 7 fibers, with 6 sectors in each fiber. The worst case end-to-end loss is about 55 dB and to compensate, 2 amplifiers can be used with 30 dB gain and 4 dB noise figure. The achieved OSNR without FEC is about 19.2 dB, and since this may not be enough to yield an acceptable BER, FEC can be added at the transceivers, resulting in an OSNR of 28.2 dB. The EOS port count is about 519 ports per sector in the static wavelength assignment case, and reduces to just 7 ports in fully dynamic wavelength assignment case.

As another network example, consider column 4 in the table shown in FIG. 3A for ψ=1. Note that for a 100,000 node DC, we have 391 sectors that are mapped onto 66 fiber rings in the backplane, resulting in a EOS of 578 ports at the drop side, and a worst case end-to-end loss of 65 dB. The resulting OSNR with is about 25.5 dB which results in acceptable BER.

Figure 3B:
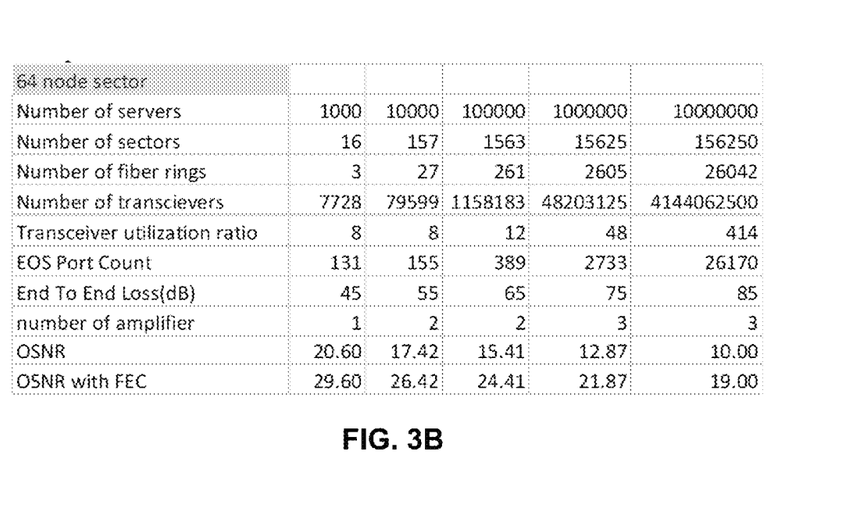
FIG. 3B illustrates resources required when an embodiment of a 64-nodes-per-sector SUDHA network is scaled in accordance with some embodiments described herein.

FIG. 3B illustrates resources required when an embodiment of a 64-nodes-per-sector SUDHA network is scaled in accordance with some embodiments described herein. Here we use 4 ES s of 16×16 configuration and 16 AS s of 4×4 configuration per sector. Server line-rate is 10 Gbps. The input power for each transceiver is assumed to be +5 dBm and the corresponding OSNR with FEC for even DC with up to a million servers is within acceptable limit. Note that this SUDHA network requires a high number of ports at an EOS.

Wavelength Assignment Plans in the Datacenter Backplane

In this section we discuss a key engineering aspect to the DC architecture—the wavelength assignment plan (WAP). The wavelength assignment scheme is dependent on the manner of traffic supported in the DC. There are three types of wavelength assignment plans: (a) static; (b) dynamic; and (c) time-shared. For every server there is proportional capacity in the backplane implying full bisection bandwidth is available. However, the issue of whether the available bisection bandwidth is such that it can be used for any server to talk to any other server with no limit on traffic is discussed subsequently.

The minimum number of wavelengths required without speedup per sector for the sector to add all its data is H, and there are n sectors, the bound on the minimum number of wavelengths to be dropped to achieve any-to-any connectivity without reconfiguration is H+n−1. Hence to achieve all-to-all connectivity with full bisection bandwidth we need (H+n−1)F transceivers at every sector for drop purposes. A better bound is for symmetric loads, in which case a drop of nH wavelengths are sufficient.

In the case of loads that cannot be divisible across ports in an EOS, the WAP is challenging on account of resources used. In case of static configuration of WSS, the P×Q WSS must support P=ψF and Q=ψw. For small sized DCs, this arrangement is feasible. In case of dynamic configuration of the WSS, P=nF and Q=H.

In the case where loads can be divisible, packets going to the same destination can be guided into the core through different EOS ports (and hence wavelengths). The case of static WSS requires that P=F(n+H−1) for full bisection bandwidth and Q=n+h−1. The bound of F(n+H−1) can be derived as follows—there are at the maximum of n sectors per fiber, and F fibers, with H wavelengths trying to communicate with the destination. For non-uniform traffic, we allow loads to be distributed across ports and further allow multi-hopping between a source and destination via one or more intermediate sectors. For a packet to be sent from ingress sector $S_i$ to egress sector $S_j$, we find an intermediate sector $S_k$ such that the wavelengths $\lambda_{ik}$ and $\Delta_{kj}$ are: (a) available and (b) can accommodate the demand $S_{ij}$ and (c) with the constraint that the EOS at sector $S_k$ can switch the demand from the port accepting $\lambda_{ik}$ to the port sending $\lambda_{kj}$.

To prove that multi-hopping is a work conserving system, i.e. does not impact: (a) blocking performance, and (b) works with adequate resources, we examine the add/drop EOS architecture. One of the ports of each of the F couplers of 1×ψ configuration is connected to a cascaded P×Q WSS. For the case of multi-hop, we have P=ψF, and Q=ψw, where the value of Q depends on the load type (atomic/non-atomic). The following algorithm is further used for adding channels between servers. The static assignment guarantees that there is one wavelength between ever sector-pair in the DC.

The process can work as follows. During initialization, there is one channel dedicated between $S_i$ and $S_j$. If the requirement between $S_i$ and $S_j$ exceeds one wavelength capacity, then using segment routing we form two new segments: between $S_i$ and $S_k$ and between $S_k$ and $S_j$. Sector $S_k$ can be chosen to satisfy the three intermediate sector requirements above. We continue to repeat the process till the demands are all satisfied. Note that, at any given time, of the Q drop ports only Hare used.

An assignment of $\lfloor H/Fn \rfloor$ channels between every sector pair is sufficient for any unicast traffic. This statement can be proven by contradiction as follows. If $\lfloor H/Fn \rfloor$ are assigned between every sector pair, then by default the DC is engineered for symmetric traffic. However, for the case of asymmetric traffic, let us consider the worst case where all the servers in a sector want to communicate with all the servers in another sector. In such a case, we argue that there will be enough number of free EOS at other sectors which will be able to process the excess H−$\lfloor H/Fn \rfloor$ traffic as well as there will be enough pre-assigned wavelengths based on the $\lfloor H/Fn \rfloor$ wavelengths between any two sectors to multi-hop the extra traffic. By contradiction, if this was not the case, then the bisection bandwidth would be <100%. By conservation, it also implies that an intermediate sector $S_k$ balances for $S_i$ adding and $S_j$ dropping additional capacity beyond what is symmetrically allocated to $S_k$. The condition under which the EOS for multihopping would not be available is when the traffic entering the core backplane is greater than 100% of the total capacity of all the servers. However, this cannot happen since the backplane supports at least 100% bisection bandwidth. In fact, the backplane supports CnHF amount of bisection bandwidth where C is the capacity of a wavelength.

Some embodiments facilitate time-shared access. The concept is as follows: let λm be the number of wavelengths (assume fixed spacing), where m>n. Choose r: $\lambda m/r \in \mathbb{Z}$, and $\bar{r}=\lambda m-n$. λm/r is the residual number of wavelengths in the fiber backplane, whereby, λm/r are assigned to each sector, for transmission, and $\bar{r}$ is the number of wavelengths not assigned to any sector. Then, these $\bar{r}$ channels in each fiber can be used initially for time-shared access. Further details of time-shared protocols that can be used in some embodiments described herein can be found in (1) A. Gumaste, et al, "An Autonomic Virtual Topology Design and Two-Stage Scheduling Algorithm for Light-trail WDM Networks", IEEE/OSA Journal of Optical Communications and Networking, Vol. 3, No. 4, pp 372-389, April 2011, and (2) C. Nuzman and I. Widjaja, "Time-domain Wavelength Interleaved Networking with Wavelength Reuse" Proc. of 25th IEEE INFOCOM, pp 1-12, April 2006, Barcelona, Spain.

Datacenter Backplane Protocol

The protocol used in the datacenter backplane is based on the concept of segment routing (SR), which is a recent effort in the IETF to simplify operations, administration, maintenance and provisioning (OAM&P) functionality in large networks. It is an add-on to MPLS and makes the MPLS forwarding plane faster—one of the key requirements within the DC. The idea is to use existing IGP protocols to advertise segment information and facilitate an ingress node to create a source-routed path to the destination. However, instead of using IGP protocols for advertisement, we use an SDN controller within the DC domain. This eliminates route computation at intermediate nodes. Thus, the SR approach reduces the per-flow state maintenance and route computation complexity making service deterministic and hence carrier-class. The SR approach is also able to adhere to Equal Cost Multiple Path (ECMP) requirements that are best adjudicated at an ingress node.

In an SR domain, nodes are labeled with globally unique identifiers (called node-segment IDs) and links are labeled with locally unique identifiers (called adjacency-segment IDs) that are passed using an SDN controller. The identifiers allow the creation of destination specific routes at every source node which can use these for computing a source routed path. A centralized controller has knowledge of the global state of the network, and can optimize path selection to maximize network utilization. Additionally SR has the following features: (1) SR does not require Label Distribution Protocol (LDP) or Resource Reservation Protocol for Traffic Engineering (RSVP-TE) hence eliminating extensive control overhead, (2) with the use of node/adjacency-segments any path can be configured for a service, and (3) load balancing is supported with the use of prefix-segment/node-segment that identifies an ECMP-aware shortest path to the destination. Communication in the SUDHA DC follows the SR approach.

The protocol works as follows. The DC is assumed to be an SDN controlled domain. The idea is to translate incoming network-wide identifiers such as MAC/IP/port/tag with DC-specific labels that facilitate source routing. An incoming packet headers' field is mapped onto a DC-specific addressing scheme. The protocol imbibes a SDN philosophy whereby various network-wide identifiers are mapped to local identifiers and forwarding is done based on these local identifiers. For traversing an N×N switch, the protocol allocates $2 \log_2 N$ bits. These bits are sufficient to identify a destination port on the switch. The protocol uses a control plane that allocates DC-specific addresses and routes at the edge nodes so that switching and routing is done based on $2 \log_2 N$ bits for an N×N switch. Translation from network-wide identifiers to DC-specific identifiers happens at the ES.

Figure 4:
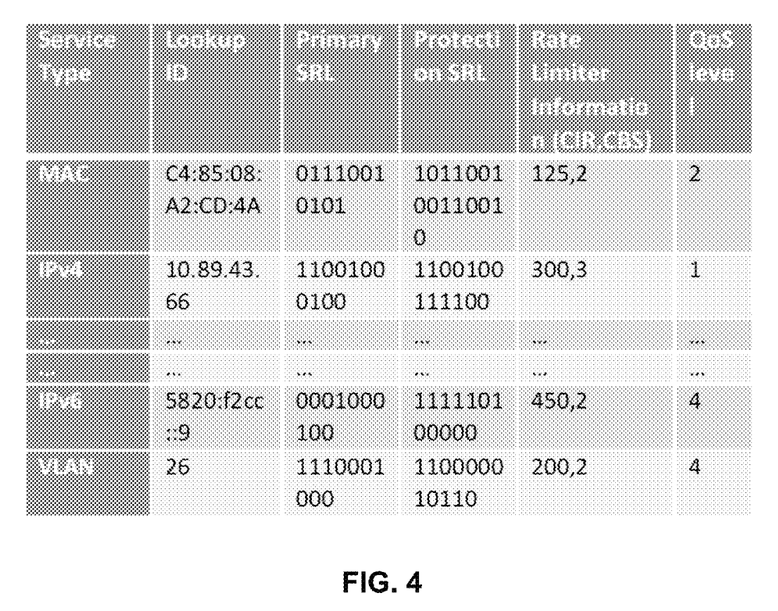
FIG. 4 illustrates a software-defined networking (SDN) flow table in accordance with some embodiments described herein.

FIG. 4 illustrates an SDN flow table in accordance with some embodiments described herein. This table is populated by the controller. The table depth is equal to the number of services provisioned in the sector, which is of the order of a 10,000 services easily achieved through commercial TCAMs (tertiary content addressable memories).

Figure 5:
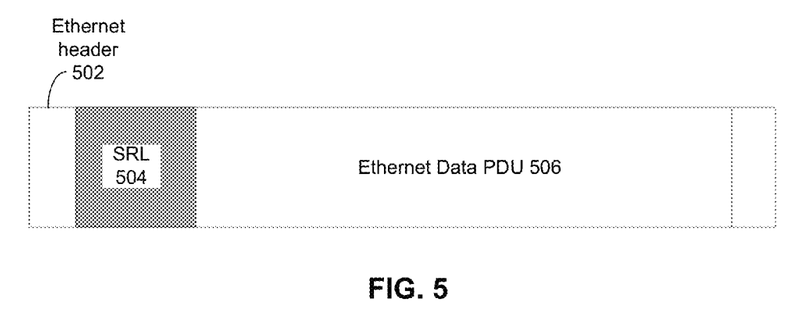
FIG. 5 illustrates primary and protection segment routed label in accordance with some embodiments described herein.

As shown in FIG. 5, primary and protection segment routed label (SRL) 504 can be pushed onto the incoming PDU, i.e., between Ethernet header 502 and Ethernet data PDU 506 in accordance with some embodiments described herein. This label allows the frame to be routed to either another AS+ES (in case of intra-sector communication), or to an EOS in case of inter-sector communication. Unicast and multicast are separated by the use of a unique Ethertype in the SRL.

As part of the 20-bit label pushed on to the PDU, are 5 pointer bits that tell a switch as to from where to start reading the $2 \log_2 N$ bits for switching. A packet that enters a switch is first checked if it is computed to an SR compatible packet. If not, then it is sent to an ingress logic that maps the packet PDU with a corresponding SRL. The packet with the SRL is then sent to a forwarding logic in the switch. The forwarding logic examines the pointer and selects the corresponding $2 \log_2 N$ bits for decision making. The logic then sends the packet to the appropriate virtual output queue and performs switching. The forwarding logic also increments the pointer. For a 256 node sector, one SRL is sufficient for both intra sector and inter-sector (up to the EOS) communication.

For inter-sector communication, the ingress ES on finding that the destination does not match its ingress forwarding table, pushes a default SRL to the EOS and sends the packet. The EOS in the ingress sector is assumed to have DC-wide address knowledge, and hence maps the packet to a wavelength from which the destination sector would receive the packet and swaps the SRL with a new SRL. The destination EOS further maps the packet to the appropriate ES port and swaps the existing SRL with another SRL that facilitates forwarding to the destination.

Protocol scalability is ensured as there is no learning or lookup at intermediate nodes and the centralized controller is assumed to be aware of topology updates, etc. By usage of MPLS-TP variant of MPLS that facilitates the IEEE802.1ag, control plane topology updates and new server/port/switch registration as well as fault tolerance issues are resolved. Each ES has a table that maps different network identifiers to binary labels. This table is periodically refreshed through the control plane.

Protection Switching

Figure 6A:
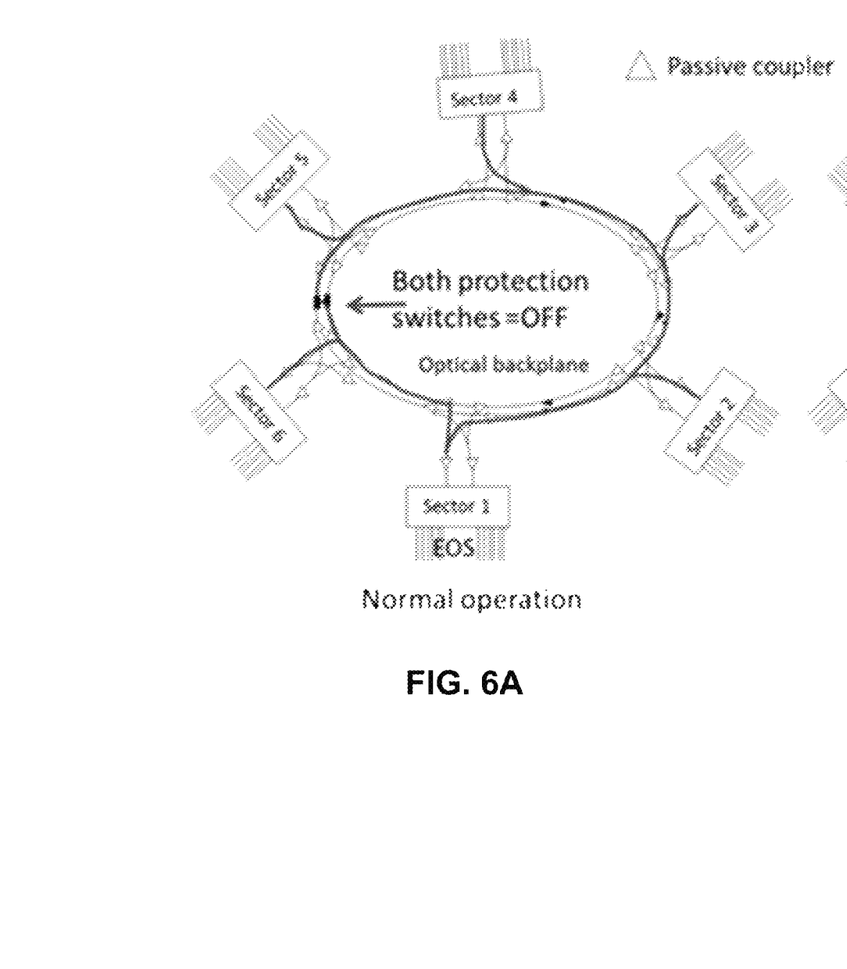
FIGS. 6A and 6B illustrate a protection mechanism in the datacenter backplane in accordance with some embodiments described herein.
Figure 6B:
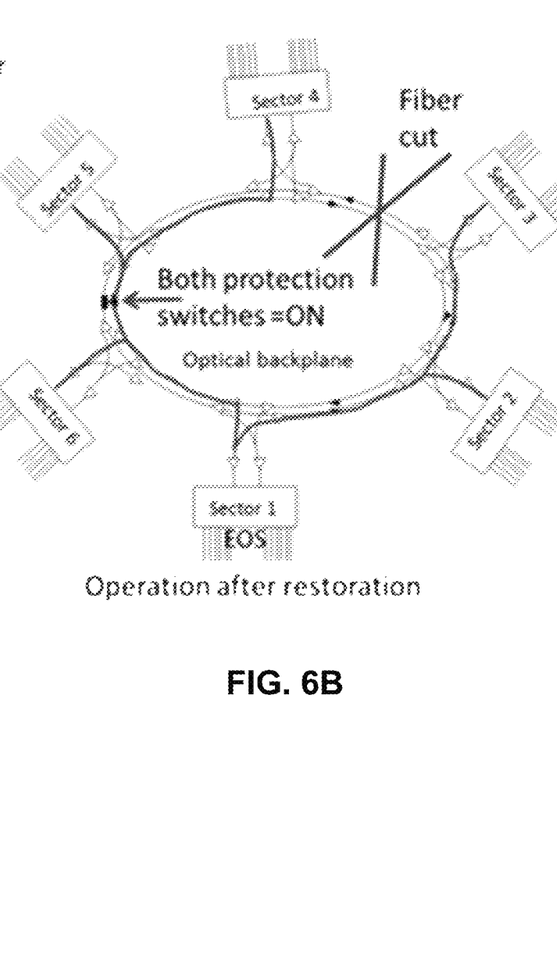

FIGS. 6A and 6B illustrate a protection mechanism in the datacenter backplane in accordance with some embodiments described herein. As shown in the figure, the protection switches are used only for the purpose of protection—they are turned ON when a loss of signal is detected in a ring. Protection switching includes the following operations: (1) the switch in both fiber rings that converts the closed ring to an open ring detects loss of signal; (2) the switch in the fiber ring in which there is loss of signal now turns from OFF to ON; (3) the ring in which the failure occurs is now restored by the switch turning ON—and the signal is now collected by the drop coupler without any local switch configuration. In this way protection is accomplished in the datacenter backplane.

An Example Implementation

The SUDHA DC was validated via implementation and simulation. Specifically, a 2-ring 4-sector DC with associated optics and a designed SR based switching fabric was implemented in a test-bed. The test-bed was built for 4-sectors and two rings, using Finisar 1×9 and 1×20 WSS (with flexible grid support) at each sector for channel add, in addition to a JDSU 8×13 WSS with flexible grid support for channel drop (all LCOS). Associated 3 dB (1×2) couplers are used to create the optical backplane. For the 4 sector testbed no amplifiers are required. 6 channels at 12.5 GHz spacing are assumed and supported by customized XFPs. We assume a ring can suffice with 2 sectors and hence there are two rings 2 sectors each.

A combination of two types of software defined SR routers (SD-SRs) were used as ES, AS and EOS. ESs were connected to servers at 1.10 Gbps IOs, while EOSs are connected to the fiber bus. The SD-SRs were developed based on a two-stage VOQ switch architecture in a single chip (FPGA) and high-speed packet buffers. The SD-SRs were modified to support ECMP by efficiently implementing multipath functionality in the data path.

The SD-SRs were custom designed for the SUDHA DC example implementation. The SD-SRs are 1 RU appliances that consists of a 28 layer PCB that supports a Xilix Virtex 6 FPGA along with peripheral IOs and memories (SRAMs and DDR3s). The IOs include SFP+, SFP and XFP cages that are connected to a serializer/deserializer chip which interfaces with the FPGA. The FPGA supports a two-stage VOQ architecture.

Inside the FPGA is a VHDL induced bit-file that supports the following modules: (a) an entry logic; (b) SDN tables; (c) SRL encapsulation logic; (d) contention and external memory management module; (e) controller interface machine; and (f) switch fabric. The two stages in the switch architecture use opportunistic scheduling such that a work conserving switch is obtained: if a contention occurs for a packet, it is stored on board the FPGA in block RAMs and only if the block RAMs are full, does the packet get stored in off-FPGA SRAMs (undesirable due to access time). Such architectures result in low-latency.

The centralized controller with OpenFlow (v1.2) protocol was connected to one of the SD-SRs for service provisioning and monitoring. The service was configured from the centralized controller, which computes the path between the source and destination and then populates the tables shown in ingress SD-SR. Once the SRL was pushed, the packet was routed to the destination with the intermediate SD-SRs working on the packet's SRL and decrementing the pointer at each hop. The traffic tests were performed using a JDSU MTS-6000 traffic tester and the round-trip latency and throughput of the configured services were measured.

Round-trip latency and throughput as a function of load were measured, where load is computed as the number of bits-sent-per-second to the maximum capacity of the channel. Since the SR protocol involves prepending the packet with an SRL tag, the impact across different sized packets was also measured. Measurement results showed that the round-trip latency remained constant throughout up to 80% of load for different packet sizes. It is almost same for both services. This is due to similarity in the architecture of sectors and use of fiber ring to interconnect these sectors, with the difference being only addition of a small optical path between sector1-sector3 that does not contribute much to the latency. Based on these results, we can conclude that even if there were larger DC sectors, we can expect a similar latency profile.

In summary, these result validate the low-latency design and demonstrate the deterministic behavior of SUDHA networks. It was observed that the throughput remained 100% for loads up to 80-90% and then reduced to around 80%-91% for 100% load depending on different packet frame sizes. This change in throughput is due to the encapsulation of SRL.

In addition to the throughput and latency results, tests were performed for adding and removing sectors from the SUDHA network. It was found that there was no change in BER or loss of packets during adding or dropping a sector. The symbol error rate (SER) which is linearly proportional to BER was plotted as a function of receiver power across two rings by varying the number of couplers and emulating additional rings without an amplifier. The simulation is equivalent to a 100,000 server DC and shows that the received power is sufficient to get a healthy BER. The plot shows stability of the received power as a function of symbol error rate (SER) while the eye showed clear response at the receiver.

Various wavelength assignment schemes were simulated as a function of load for different traffic mixes. Specifically, three types of traffic were compared—atomic, non-atomic and multihop and the comparison was done over static assignment of channels (no WSS configuration) and dynamic assignment of channels (WSS configuration). The simulation was performed in Matlab as a discrete event model. Packets were generated as Poisson arrivals with general service time. In case of atomic loads, we assume a circuit like set up, while for non-atomic loads we assume distribution of packets between EOS ports. The DC simulated was for 40,000 servers while all other parameters were similar to the model FIG. 3A. EOS configuration time was assumed to be 2 ms. The traffic mix consisted of randomly generated elephant flows and mice. The ratio (of elephants to mice) is varied in 12 steps from 90:10 to 20:80. The average duration of an elephant flow was 20 seconds with a variance of 10. 5 different schemes were simulated under these traffic conditions. Static provisioning resulted in an average latency of 15 microseconds, while dynamic provisioning resulted in an average latency of 830 microseconds. On average, the latency for only elephant flows was 62% less than the latency for mixed flows. The most important takeaway from these simulations was that despite the dynamic schemes being more latency prone than the static ones, the dynamic multihop scheme especially for elephant flows was nearly as good as the static scheme, thus validating the mulihop assignment.

Comparison with Other Approaches

Several proposals for a scalable and fault-tolerant data center architectures exist. N. Farrington et al, "Helios: A hybrid electrical/optical switch architecture for modular data centers," Proc. of the ACM SIGCOMM 2010 conference, pp 339-350, August 2010, New Delhi, India describes HELIOS, which is a hybrid architecture that implements the data center core network using electrical packet switches and MEMS-based optical circuit switches. It makes use of a Topology Manager (TM) to continuously read flow counters from each aggregation switch and thereby calculate a traffic matrix, which is then used to calculate the new topology and configure all pod and optical circuit switches. As the number of servers increase, the size of traffic matrix increases and this is limited by the computational capacity of the TM.

K. Chen et al, "OSA: An optical switching architecture for data center networks with unprecedented flexibility," Proc. of 9th USENIX Symposium on Networked Systems Design and Implementation (NSDI 12), pp 239-252, April 2012, San Jose, Calif., USA describes OSA, which is an optical DC that benefits from the reconfigurable properties of optical devices to facilitate dynamic set-up of optical circuits. For this solution as well as HELIOS, the reconfiguration delay of the MEMS-based switches and WSSs (in the order of milliseconds) proves to be a bottleneck. In fact, OSA admits that this delay affects latency-sensitive mice flows. SUDHA is able to provide a more scalable DC and where reconfiguration of the WSS is not an issue.

G. Porter et al, "Integrating microsecond circuit switching into the data center," Proc. of the ACM SIGCOMM 2013 pp 447-458, August 2013, Hong Kong, China uses a WSS and is based on the presumption of very fast switching of the WSS. This particular WSS is built using DLP technology. In contrast, the embodiments described in this disclosure do not require fast switching nor do we require DLP technology that has been known to have reliability and scalability issues.

K. Chen et al, "WaveCube: A Scalable, Fault-Tolerant, High-Performance Optical Data Center Architecture," In Proc. of 34th IEEE INFOCOM, Apr. 26-2015, Hong Kong and G. Wang et al, "cThrough: Part-time optics in data centers," Proc. of the ACM SIGCOMM 2010, pp 327-338, August 2010, New Delhi, India are other approaches towards a hybrid design. Wavecube assumes multipath routing and dynamic link bandwidth scheduling, both of which are strictly avoided in embodiments described herein. cThrough and Wavecube require perfect matching based graph techniques and create tight bounds on wavelength-flow assignment relationships. The WaveCube architecture is a recent proposal and involves a torus like structure supported by optics at the interconnection points. The issue with such an architecture is that the bisection bandwidth decreases as the number of servers increases. The SUDHA network described in this disclosure results in no penalty of the bisection bandwidth even with increase in number of servers.

While the WSS forms the backbone of most architectures, it is pertinent to mention the role of the AWG—which is essentially a predecessor to the WSS. A 1×X WSS allows a composite signal to be grouped into any combination across the X output ports, a 1×X AWG has strict port-wavelength mapping.

C. Kim, M. Caesar, and J. Rexford, "Floodless in SEATTLE: A Scalable Ethernet Architecture for Large Enterprises," Proc. of the ACM SIGCOMM 2008, pp 3-14, August 2008, Seattle, Wash., USA describes a protocol that is backward-compatible with Ethernet that facilitates 'plug and play' operation in the data center, allowing for dynamic repositioning of servers and placing no restriction on the underlying network topology. In SEATTLE, data forwarding is based on flat 48-bit MAC addresses. To provide all-to-all communication, switches are required to maintain entries for every host in the DC. Broadcast based topology discovery protocols take considerable amount of convergence time whenever a node or link failure occurs in the DC which is a very frequent event in large scale data centers. Despite this, forwarding loops may also exist in the network.

R. N. Mysore et al, "Portland: A scalable fault tolerant layer 2 data center network fabric," Proc. of the ACM SIGCOMM 2009, pp 39-50, August 2009, Barcelona, Spain describes a system that discovers the underlying network topology with a Location Discovery Protocol. PortLand implements a hierarchical addressing scheme that requires a small switch state to be maintained. PortLand uses a three layer fat tree topology. As servers are added to the network, either the port density of the switches in the network are increased, or another layers of switches need is added. Hence, in contrast to embodiments described in this disclosure, an in-situ update of a DC is complex under Portland.

The approach described in A. Greenberg et al, "VL2: A scalable and flexible data center network," Proc. of the ACM SIGCOMM 2009, pp 51-62, August 2009, Barcelona, Spain provides a fully connected backbone by connecting the aggregation and core switches in a Clos topology. Even though Clos topologies are non-blocking and scalable, the levels in the core network increase with the increase in the number of servers. Further, VL2 uses a distributed link state protocol that requires a high convergence time after a node or link failures.

The system in C. Guo et al, "DCell: A scalable and fault-tolerant network structure for data centers," Proc. of the ACM SIGCOMM 2008, pp 75-86, August, 2008, Seattle, Wash., USA was proposed for connecting end hosts in an efficient manner. DCell also provides in-situ up gradation of DC without affecting the existing network topology. However, the upper bound of the number of servers that can be added to the data center is limited by the number of network interface cards of servers. Additionally, DCell is limited by high wiring complexity and also the requirement of end-hosts to switch packets at the cost of reduced bisection bandwidth.

CONCLUSION

The SUDHA based network described herein can be used to create large data-centers by using an optical bus based backplane that makes the backplane resemble a colored hypergraph. An important advantage of a SUDHA network is the use of a switchless backplane (i.e., a backplane that does not require any electronic switching) and an interconnection pattern that enables scalability to a million servers. A carrier class protocol using segment routing which is a recently proposed MPLS alternative readily usable in a DC environment using SDN principles was described. SUDHA based networks were compared to other DC designs from a cost/performance perspective. A test-bed was built to comprehensively study the architecture and measure system performance especially for the scalable optical backplane.

The data structures and code described in this disclosure can be partially or fully stored on a non-transitory computer-readable storage medium and/or a hardware mechanism and/or a hardware apparatus. A computer-readable storage medium includes, but is not limited to, volatile memory, non-volatile memory, magnetic and optical storage devices such as disk drives, magnetic tape, CDs (compact discs), DVDs (digital versatile discs or digital video discs), or other non-transitory media, now known or later developed, that are capable of storing code and/or data. Embodiments described in this disclosure can be implemented in ASICs, FPGAs, dedicated or shared processors, and/or other hardware modules or apparatuses now known or later developed. Specifically, the methods and/or processes may be described in a hardware description language (HDL) which may be compiled to synthesize register transfer logic (RTL) circuitry which can perform the methods and/or processes. Embodiments described in this disclosure may be implemented using purely optical technologies. The methods and processes described in this disclosure can be partially or fully embodied as code and/or data stored in a computer-readable storage medium or device, so that when a computer system reads and/or executes the code and/or data, the computer system performs the associated methods and processes. The foregoing descriptions of embodiments of the present invention have been presented only for purposes of illustration and description. They are not intended to be exhaustive or to limit the present invention to the forms disclosed. Accordingly, many modifications and variations will be apparent to practitioners having ordinary skill in the art. Additionally, the above disclosure is not intended to limit the present invention. The scope of the present invention is defined by the appended claims.

What is claimed is:

1. A network, comprising:
a set of optical fiber rings, wherein each optical fiber ring carries data traffic on multiple wavelengths, and wherein each optical fiber ring is partitioned into multiple sectors; and
each sector in the multiple sectors comprising:
an add-wavelength-selective-switch (add-WSS) communicatively coupled via a passive optical coupler to an optical fiber ring in the set of optical fiber rings, wherein the add-WSS is used for sending all data traffic that originates from the sector and is destined to other sectors, wherein an optical signal in the optical fiber ring is combined with an optical signal from the add-WSS and passed along the optical fiber ring to other sectors;
an add-electro-optical-switch (add-EOS) communicatively coupled to the add-WSS;
a set of drop-wavelength-selective-switches (drop-WSSs) communicatively coupled via a set of passive optical couplers to the set of optical fiber rings, wherein the set of drop-WSSs are used for receiving data traffic from other sectors, wherein each passive optical coupler in the set of passive optical couplers splits an optical signal in an optical fiber ring into two parts, wherein a first part is passed along the optical fiber ring to other sectors, and wherein a second part is provided to the drop-WSS;
a drop-electro-optical-switch (drop-EOS) communicatively coupled to a drop-WSS in the set of drop-WSSs;
a set of N aggregation switches, wherein each aggregation switch in the set of aggregation switches is communicatively coupled with the add-EOS and the drop-EOS;
a set of HM/N edge switches, wherein each edge switch in the set of edge switches is communicatively coupled with each aggregation switch in the set of aggregation switches;

a set of servers wherein each server in the set of servers is communicatively coupled to at least one edge switch In the set of edge switches; and wherein H wavelengths are allocated to each sector, wherein M is the muxponding gain of the network, and wherein M is either (a) a number of servers per wavelength in a backplane to achieve full bisection bandwidth, or (b) an overprovisioning factor enabling capacity for intra-sector traffic resulting in less than full bisection bandwidth.

2. The network of claim 1, wherein the set of optical fiber rings comprises clockwise optical fiber rings and counter-clockwise optical fiber rings, wherein the set of optical fiber rings are configured to perform protection switching upon detecting a failure.

3. A datacenter, comprising:

a set of servers; and a datacenter backplane communicatively coupled to the set of servers, wherein the datacenter backplane comprises:

a set of optical fiber rings, wherein each optical fiber ring carries data traffic on multiple wavelengths, and wherein each optical fiber ring is partitioned into multiple sectors; and each sector in the multiple sectors comprising:

an add-wavelength-selective-switch (add-WSS) communicatively coupled via a passive optical coupler to an optical fiber ring in the set of optical fiber rings, wherein the add-WSS is used for sending all data traffic that originates from the sector and is destined to other sectors, wherein an optical signal in the optical fiber ring is combined with an optical signal from the add-WSS and passed along the optical fiber ring to other sectors;

an add-electro-optical-switch (add-EOS) communicatively coupled to the add-WSS;

a set of drop-wavelength-selective-switches (drop-WSSs) communicatively coupled via a set of passive optical couplers to the set of optical fiber rings, wherein the set of drop-WSSs are used for receiving data traffic from other sectors, wherein each passive optical coupler in the set of passive optical couplers splits an optical signal in an optical fiber ring into two parts, wherein a first part is passed along the optical fiber ring to other sectors, and wherein a second part is provided to the drop-WSS;

a drop-electro-optical-switch (drop-EOS) communicatively coupled to a drop-WSS in the set of drop-WSSs;

a set of N aggregation switches, wherein each aggregation switch in the set of aggregation switches is communicatively coupled with the add-EOS and the drop-EOS;

a set of HM/N edge switches, wherein each edge switch in the set of edge switches is communicatively coupled with each aggregation switch in the set of aggregation switches;

a set of servers, wherein each server in the set of servers is communicatively coupled to at least one edge switch in the set of edge switches; and wherein H wavelengths are allocated to each sector, wherein M is the muxponding gain of the datacenter, and wherein M is either (a) a number of servers per wavelength in a backplane to achieve full bisection bandwidth, or (b) an overprovisioning factor enabling capacity for intra-sector traffic resulting in less than full bisection bandwidth.

4. The datacenter of claim 3, wherein the set of optical fiber rings comprises clockwise optical fiber rings and counter-clockwise optical fiber rings, wherein the set of optical fiber rings are configured to perform protection switching upon detecting a failure.

5. A datacenter, comprising:

a set of optical fiber rings, wherein each optical fiber ring carries data traffic on multiple wavelengths, and wherein each optical fiber ring is partitioned into a set of sectors; and a set of racks, wherein each rack corresponds to a sector, wherein each rack includes a set of servers that is stacked vertically in the rack, and wherein each rack includes a set of top-of-the-rack (ToR) switches that is communicatively coupled to each server in the rack, wherein the set of ToR switches comprises:

an add-wavelength-selective-switch (add-WSS) communicatively coupled via a passive optical coupler to an optical fiber ring in the set of optical fiber rings, wherein the add-WSS is used for sending all data traffic that originates from the sector and is destined to other sectors, wherein an optical signal in the optical fiber ring is combined with an optical signal from the add-WSS and passed along the optical fiber ring to other sectors;

an add-electro-optical-switch (add-EOS) communicatively coupled to the add-WSS;

a set of drop-wavelength-selective-switches (drop-WSSs) communicatively coupled via a set of passive optical couplers to the set of optical fiber rings, wherein the set of drop-WSSs are used for receiving data traffic from other sectors, wherein each passive optical coupler in the set of passive optical couplers splits an optical signal in an optical fiber ring into two parts, wherein a first part is passed along the optical fiber ring to other sectors, and wherein a second part is provided to the drop-WSS; and a drop-electro-optical-switch (drop-EOS) communicatively coupled to a drop-WSS in the set of drop-WSSs;

a set of N aggregation switches, wherein each aggregation switch in the set of aggregation switches Is communicatively coupled with the add-EOS and the drop-EOS;

a set of HM/N edge switches, wherein each edge switch in the set of edge switches is communicatively coupled with each aggregation wherein each server in the set of servers is communicatively coupled to at least one edge switch in the set of edge switches; and wherein H wavelengths are allocated to each sector, wherein M is the muxponding gain of the datacenter, and wherein M Is either (a) a number of servers per wavelength in a backplane to achieve full bisection bandwidth, or (b) an overprovisioning factor enabling capacity for intra-sector traffic resulting in less than full bisection bandwidth.

6. The datacenter of claim 5, wherein the set of optical fiber rings comprises clockwise optical fiber rings and counter-clockwise optical fiber rings, wherein the set of optical fiber rings are configured to perform protection switching upon detecting a failure.

* * * * *